US008411146B2

(12) United States Patent
Twede

(10) Patent No.: US 8,411,146 B2
(45) Date of Patent: Apr. 2, 2013

(54) SINGLE CAMERA COLOR AND INFRARED POLARIMETRIC IMAGING

(75) Inventor: David Twede, Orlando, FL (US)

(73) Assignee: Lockheed Martin Corporation, Bethesda, MD (US)

(*) Notice: Subject to any disclaimer, the term of this patent is extended or adjusted under 35 U.S.C. 154(b) by 847 days.

(21) Appl. No.: 12/554,681

(22) Filed: Sep. 4, 2009

(65) Prior Publication Data

US 2011/0058038 A1    Mar. 10, 2011

(51) Int. Cl.
G01J 4/00 (2006.01)
G02F 1/01 (2006.01)
G09B 9/00 (2006.01)
H04N 5/33 (2006.01)
H04N 9/47 (2006.01)

(52) U.S. Cl. ........ 348/148; 250/225; 348/122; 348/135; 348/164; 356/364

(58) Field of Classification Search .............. 348/148, 348/122, 135, 164; 250/225; 356/364
See application file for complete search history.

(56) References Cited

U.S. PATENT DOCUMENTS

| | | | | |
|---|---|---|---|---|
| 3,971,065 A * | 7/1976 | Bayer | ............................ | 348/276 |
| 5,384,469 A * | 1/1995 | Choi | ............................ | 257/21 |
| 5,841,574 A * | 11/1998 | Willey | .......................... | 359/351 |
| 6,184,984 B1 * | 2/2001 | Lee et al. | ...................... | 356/369 |
| 6,694,094 B2 * | 2/2004 | Partynski et al. | ................. | 396/7 |
| 7,072,039 B2 | 7/2006 | Dobbs et al. | | |
| 7,274,454 B2 | 9/2007 | Kowarz et al. | | |
| 7,557,918 B1 * | 7/2009 | Newman et al. | ............. | 356/369 |
| 7,573,579 B2 * | 8/2009 | Brady | .......................... | 356/491 |
| 7,582,857 B2 * | 9/2009 | Gruev et al. | .................. | 250/225 |
| 7,619,685 B2 * | 11/2009 | Wernersson | ................... | 348/374 |
| 7,760,919 B2 * | 7/2010 | Namgoong | .................... | 382/117 |
| 7,813,039 B2 * | 10/2010 | Perkins et al. | ............ | 359/485.05 |
| 8,072,599 B2 * | 12/2011 | Chang et al. | .................... | 356/364 |
| 8,125,370 B1 * | 2/2012 | Rogers et al. | ................. | 342/25 F |
| 2003/0059214 A1 * | 3/2003 | Partynski et al. | ................. | 396/7 |
| 2006/0164643 A1 * | 7/2006 | Giakos | .......................... | 356/369 |
| 2007/0081084 A1 * | 4/2007 | Wernersson | ............. | 348/231.99 |
| 2007/0241267 A1 * | 10/2007 | Gruev et al. | .................. | 250/225 |

(Continued)

OTHER PUBLICATIONS

Novak et al. "Performance of a High-Resolution Polarimetric SAR Automatic Target Recognition System" 1993, Lincoln Laboratory, vol. 6 No. 1, pp. 11-23.*
Carruso, Amy Houle. "Tactical Payloads for UAVs", Sep. 1999, Defense Technical Information Center, p. 9-2 SAR/MTI.*

Primary Examiner — Tonia L Dollinger
Assistant Examiner — Daniel C Murray
(74) Attorney, Agent, or Firm — Beusse Wolter Sanks Mora & Maire, P.A.

(57) ABSTRACT

A single aperture polarimetric color imaging system includes a color filter array including a plurality of RGB filter elements in a path of received radiation that includes color band and near IR light. A linear polarizer array includes a plurality of polarization filter elements that provide a plurality of different polarization orientations that are optically aligned with the RGB filter elements. A single common pixel array includes a plurality of photodetector pixels for transducing the color band or near IR light into electrical signals after processing by the color filter array and linear polarizer array. A band select switching device switches between selectively transmitting the near IR band and color band or color band including light. A signal processor is coupled to receive and process the electrical signals from the common pixel array and generates polarimetric image data from the near IR band light and color image data from the color band or color band including light.

20 Claims, 5 Drawing Sheets

U.S. PATENT DOCUMENTS

| | | |
|---|---|---|
| 2009/0021598 A1* | 1/2009 | McLean et al. ............ 348/222.1 |
| 2009/0168171 A1* | 7/2009 | Perkins et al. ................ 359/486 |
| 2010/0157298 A1* | 6/2010 | Hayter et al. ................ 356/367 |
| 2010/0271475 A1* | 10/2010 | Schwiegerling et al. ...... 348/135 |
| 2011/0299763 A1* | 12/2011 | Barbour ........................ 382/154 |
| 2012/0008133 A1* | 1/2012 | Silny et al. ...................... 356/73 |

* cited by examiner

SINGLE CAMERA COLOR AND INFRARED POLARIMETRIC IMAGING

FIELD

Disclosed embodiments related to imaging systems and more particularly to single camera polarimetric color imaging.

BACKGROUND

Conventional color video comprising intensity and color imagery is known to be unable to resolve certain objects or features in a scene, such as between backgrounds and targets in military applications. Polarization information is known to be helpful for resolving objects or features in a scene, including distinguishing between backgrounds and targets. For example, polarimetric imagery is generally needed to identify camouflage, concealment & deception (CC&D)/hidden targets because CC&D/hidden targets are not readily identified by color video alone. Polarimetric color imaging systems usually record light properties comprising color (waveband), intensity (counts) and polarization (electric field orientation).

Imaging systems can be active (include a radiation source (s), such as a laser or LED), or be passive (i.e. not include any radiation sources and thus rely on reflected or scattered naturally occurring radiation). Passive systems have the advantage of simplicity and non-detectability in defense applications.

Commercial digital cameras capture the various colors by dividing the light into individual color micro-filters. These color micro-filters are usually arranged over individual pixilated sensor elements in an array of photodetector elements of the light capture device, and generally transmit either red (R), green (G), or blue (B) wavebands. Embodied as polarimetric imagers, such cameras generally capture polarization information by adding an external rotating filter wheel polarizer that provides three or four different polarization orientations, wherein only one electric field orientation is recorded at a given time (per frame/rotation). Three to four rotations/orientations of the polarizer can span the set of linear polarizations required for most polarimetric imaging applications.

Capturing both color and multiple polarizations simultaneously poses several problems. Known configurations for simultaneous capture of color and multiple polarizations include multiple camera arrays, multiple frames, and arrangements in which part of the recorded intensity is from color and part of the recorded intensity is from polarization. Multiple camera arrays generally require two to four individual detector arrays, with three being the most common. In each case, the system cost, power and size scale with the additional detector arrays required. For multiple frames, typically three or four frames are recorded to acquire a complete set of unambiguous color and polarization signals. This reduces system performance and often increases mechanical complexity.

In arrangements in which part of the recorded intensity is from color and part of the intensity is from polarization, system designers are generally forced to accept lower performance for reduced system requirements and faster capture, since a single recorded intensity value (per pixel) has both color and polarization signal components. As a result, the respective color and polarization signal contributions is ambiguous. This reduces the reliability of either color or polarization since it cannot be deduced which provides the information received, which becomes a significant problem when the polarization signal is of interest because the polarization signal level for many objects of interest is often below 10% of the overall signal level.

SUMMARY

Disclosed embodiments include single aperture, single detector, passive polarimetric color imaging systems. As used herein "passive" refers to no light source within the system, and the system thus operates on natural occurring light (e.g., sunlight). As used herein, "light" refers to electromagnetic radiation throughout the full electromagnetic spectrum, so as to include ultraviolet (UV), visible (color) and infrared (IR). Systems disclosed herein have a single common aperture so that the systems operate exclusively on received light collected through the single common aperture (e.g., lens). In operation, the polarimetric color imaging system generally records reflected or scattered light from object(s) in a scene in a wavelength range from the ultraviolet through the near IR (e.g., 300 nm to 1,000 nm).

A band select switching device is in a path of the received light that switches between exclusively transmitting near IR band light and color band light or color band comprising light. Color band comprising light is defined herein to comprise any band or combination of bands from the UV to the near IR that includes color band light and some portion outside the color band, such as light from about 300 nm to 1,000 nm (the passband for a typical detector), with the 300 nm to 1,000 nm referred to herein as full spectrum light.

A color filter array comprising a plurality of R, G, and B filter elements is in a path of the received light. A linear polarizer array that includes a plurality of polarization filter elements that provides a plurality of different polarization orientations is optically aligned with the RGB filter elements. A single common pixel array including a plurality of photodetector pixels is included and is for transducing the color band and near IR light into electrical signals after processing by the color filter array and linear polarizer array.

Enabled by the band select switching device, the same pixels in the single common pixel array are used to obtain polarimetric image data including a plurality of different polarization orientations (typically 3 or 4 orientations) from exclusively the near IR band light during one interval of time (e.g., odd "polarization" frames, 1, 3, 5, . . . ) and the color band or color band comprising light during the other intervals of time (e.g., even "spectral" frames 2, 4, 6, . . . ). A signal processor is coupled to receive and process the electrical signals provided by the common pixel array and generate polarimetric image data exclusively from the near IR band light and color image data from the color band or color band comprising light received. In the cases the even frames include color band comprising light (e.g., full spectrum light), the processor can also subtract out the intensity ambiguity in the spectral frames by respective near IR intensities for the R, G, and B pixels obtained from intensity information measured during the even polarimetric frames. However, this intensity ambiguity reduction processing may not be necessary for a wide variety of applications.

The color image data can be used to generate color imagery and the polarimetric image data to generate polarimetric imagery. Fused overlay images can be formed which combine the color imagery and polarimetric imagery. The single aperture, single detector features of color polarimetric imaging systems disclosed herein generally have reduced system components, minimal signal ambiguities and far fewer frame variations as compared to conventional color polarimetric imaging systems.

DETAILED DESCRIPTION

Figure 1:
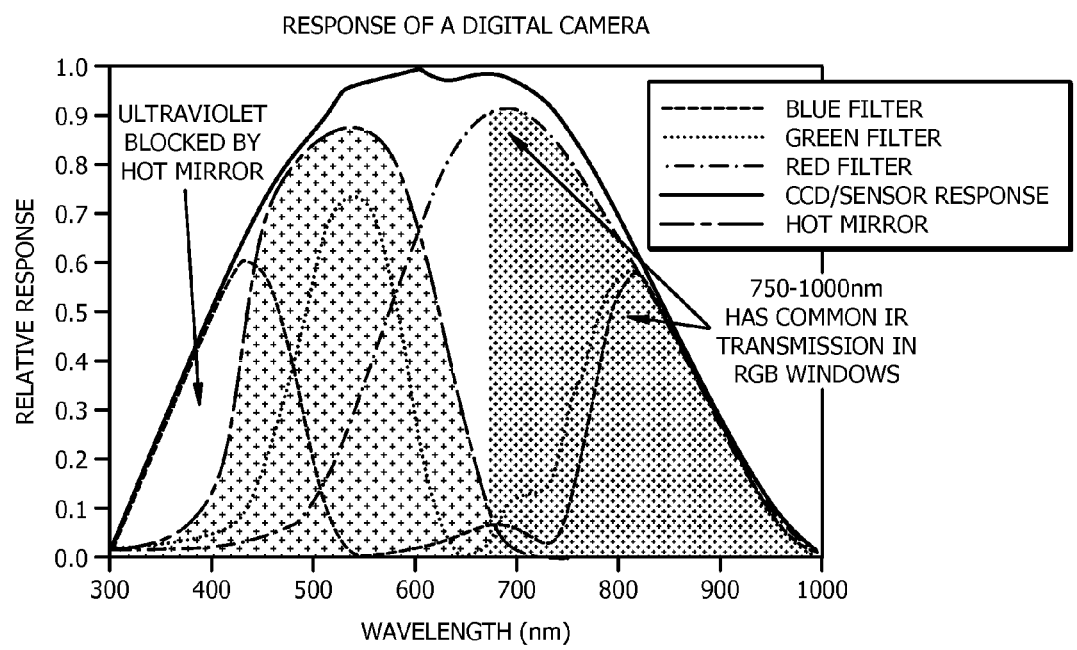
FIG. 1 is a depiction of the relative (normalized) response of a digital camera from 300 nm to 1,000 nm including typical R, G, and B filter spectral responses, and the response of the sensor itself for a CCD sensor, according to a disclosed embodiment.

Disclosed embodiments are described herein with reference to the attached figures, wherein like reference numerals are used throughout the figures to designate similar or equivalent elements. The figures are not drawn to scale and they are provided merely to illustrate the instant invention. Several aspects are described below with reference to example applications for illustration. It should be understood that numerous specific details, relationships, and methods are set forth to provide a full understanding of the disclosed embodiments. One having ordinary skill in the relevant art, however, will readily recognize that embodiments of the invention can be practiced without one or more of the specific details or with other methods. In other instances, well-known structures or operations are not shown in detail to avoid obscuring embodiments of the invention. Disclosed embodiments are not limited by the illustrated ordering of acts or events, as some acts may occur in different orders and/or concurrently with other acts or events. Furthermore, not all illustrated acts or events are required to implement a methodology in accordance with embodiments of the invention.

Disclosed embodiments include passive polarimetric color imaging systems that collect RGB/color and polarimetric video using a single camera defined herein as having a single common aperture and a single common detector/sensor array. The single common detector/sensor array feature of polarimetric color imaging systems disclosed herein provides registered frames between color comprising video and near IR polarimetric imagery. Embodiments disclosed herein thus split the capture of color and polarization information emanating from objects into separate wavebands, with the polarization information obtained exclusively from the near IR light. Such systems record separate (i) color information from color band light or color band comprising light and (ii) a plurality of (e.g., three or four) simultaneous polarization signals from exclusively the near IR. Near IR polarimetric video enables detection of difficult to detect objects in a scene such as targets in defense applications, such as CC&D/hidden targets for defense applications.

As known in the art, differences in retardation between the pixels in the detector array will give rise to undesired polarimetric differences in the imagery (i.e. between the R, G, and B filter elements coupled to the photodetector pixels). The respective RGB filter elements have their own unique polarization/retardation of visible light. Embodiments of the invention are based on the Inventor's recognition that the near IR portion of the respective RGB filter elements all overlap at same spectral point, so the polarimetric differences are reduced significantly in the near IR, as described below relative to FIG. 1.

FIG. 1 is a depiction of the relative (normalized) response of a digital camera from 300 nm to 1,000 nm including typical R, G, and B filter spectral responses, and the response of the light sensor itself for a CCD sensor. It is noted that the sensor response for CMOS photodetectors, such as a photodiodes, phototransistors or avalanche diodes, is similar to the CCD sensor response shown in FIG. 1. Conventional commercially available digital cameras include a passband filter commonly referred to as a "hot mirror" which passes only visible light and blocks ultraviolet and near IR light. By removing the passband filter, the RGB filter elements can be seen to transmit light in their individual wavebands (R, G, or B), and also transmit in the ultraviolet (B filter elements) and near IR (R, G, and B filter elements), where they have spectral responses that have significant overlap.

The response of the R, G, and B filter elements or "windows" (and detected light through each) in the near IR, has been recognized by the Inventor as being almost the same, particularly in the range from 850 nm to 1,000 nm, thus significantly reducing spectral differences between the signals captured in the near IR by the phototransducer pixels associated with the respective R, G, and B filter elements. This Inventor's recognition that the near IR portion of the RGB filter elements all overlap at about same spectral point, together with adding a band switching device that allows a single aperture/single detector array-based imaging system to record separate (i) color information in the visible optionally along with ultraviolet and near IR (e.g., full spectrum light) and (ii) a plurality of (e.g., three or four) simultaneous polarization signals in the overlapping region of the near IR, enables disclosed polarimetric color imaging systems to collect both RGB/color video and polarimetric video from near IR light using a single camera.

Figure 2:
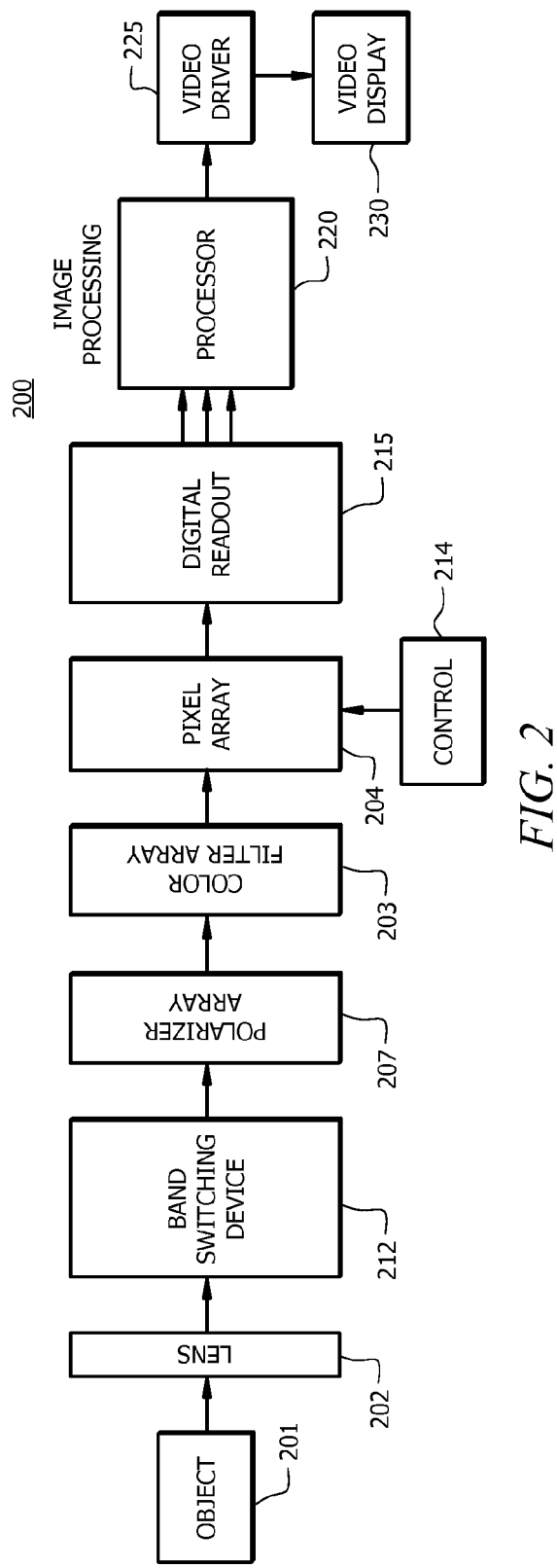
FIG. 2 is a block diagram of a passive single aperture polarimetric color imaging system, according to a disclosed embodiment.

FIG. 2 is a block diagram of a passive polarimetric color imaging system 200, according to a disclosed embodiment for imaging a scene including object 201. System 200 includes a lens 202 that provides a single common aperture for system 200 and focuses incoming light, so that system 200 operates on backscattered or reflected light emanating from object 201 collected exclusively through lens 202 and sensed by a single common pixel array 204 that comprises a plurality of phototransducer detection elements. A single common aperture can be contrasted with arrangements that comprise a plurality of optical apertures that operate in parallel.

Pixel array 204 comprises a plurality of photodetector pixels for transducing received color band signals and near infrared (IR) band signals into electrical signals. The pixel array 204 can comprise a plurality of CCD elements, or a plurality of CMOS sensing elements such as photodiodes, phototransistors, or avalanche diodes. A color filter array 203 comprises a plurality of R, G, and B filter elements. Respective ones of the color filter elements are optically aligned and substantially matched (i.e. have about the same size) with respective ones of the plurality photodetector pixels in pixel array 204. Associated with pixel array 204 is a control block 214 that comprises control electronics. As known in the art, the control block 214 generates the control voltages necessary to control operation of the pixel array 204. When the pixel array 204 comprises CMOS elements, control block 214 can generally be formed on the same substrate having a semiconductor surface (i.e. chip) and generates the on-chip voltage pulses necessary to control the operation of the pixel array 204.

A polarizer array 207 comprising a plurality of polarization filter elements provides a plurality of different polarization orientations and is optically aligned and matched (i.e. have about the same size) with respective color filter elements in color filter array 203 and respective ones of the plurality photodetector pixels in pixel array 204. The polarizer array 207 can comprise a wire-grid array, polarizing thin film, or a frequency selective surface (FSS). The polarization filter elements can be sized or spaced to polarize near IR light, but not polarize the shorter wavelength (e.g., visible) light. In such arrangements the shorter wavelength (e.g., visible) light is not polarized. For example, IR only polarizers are commercially available, with the likelihood that shortly such polarizers embodied as micro-grid arrays will also be commercially available.

The voltage outputs provided by pixel array 204 are digitally read out by digital read out 215 that generally comprises an analog to digital (A/D) converter. Pixel array 204 provides a plurality of outputs, with the number of outputs typically set by the number of photodetector pixels in pixel array 204.

A band select switching device 212 is shown in optical alignment with the pixel array 204 and color filter array 203 for switching between transmitting exclusively near IR band light (blocking UV and color band light), and color band light or color band comprising light depending on the desired effect. In the embodiment that band select switching device 212 transmits color band comprising light such as full spectrum light in one of the frames, band select switching device 212 can be transmissive across the full spectrum.

Band select switching device 212 isolates the color band light from the near IR light in one switching configuration to allow exclusively near IR band light to reach the pixel array 204. In the other switching configuration, color band light or color band comprising light reaches the pixel array to allow color imaging. Band select switching device 212 can comprise a spinning device or rocker, or other suitable device in the light path to implement band switching.

The switching can occur at video rates (e.g., at 30 to 60 Hz) so that individual frames of either color band or color comprising band or polarized near IR light can be captured with little ambiguity of waveband or polarization signal. Other switching rates made also generally can be used. For example, there are digital arrays commercially available that can be read out and cycled at rates in the kHz. In addition, some consumer digital video systems operate at 100-500 Hz for smooth slow motion video capture.

Processor 220 is coupled to receive and process the plurality of electrical signals provided by digital read out 215. The processor 220 computes polarimetric imagery from the near IR band light when the band switching device 212 selectively passes near IR band light and color imagery from color band of color band comprising signals. Processor 220 can extract color video and polarimetric near infrared video imagery at half the video rate, so that one frame is or includes color, and one frame is exclusively near IR for obtaining polarization information. As described above, in cases the non near IR frames include color band comprising light (e.g., full spectrum light), the processor can subtract out the intensity ambiguity in the spectral frames by respective near IR intensities for the R, G, and B pixels obtained from intensity information measured during the near IR only "polarimetric" frames. However, this intensity ambiguity reduction processing may not be needed for a wide variety of applications.

Final output products can generate color-only, polarimetric near IR-only or fused (color and polarization) overlay imagery. Polarimetric response will generally only occur on the near-IR portion (e.g., 750 to 1,000 nm), to reduce the influence of polarization in the visible on final color or overlay imagery products. An output of processor 220 is coupled to a video driver 225 which is coupled to video display 230, such as a video screen (e.g., monitor).

It is noted that the sequence of band switching device 212, polarizer array 207 and color filter array 203 in system 200 may be changed from that shown in FIG. 2. Any of the six (6) possible combinations of these elements may generally be used. For example, the order of lens 202 and band switching device 212 and/or the order of polarizer array 207 and color filter array 203 may be changed.

Figure 3:
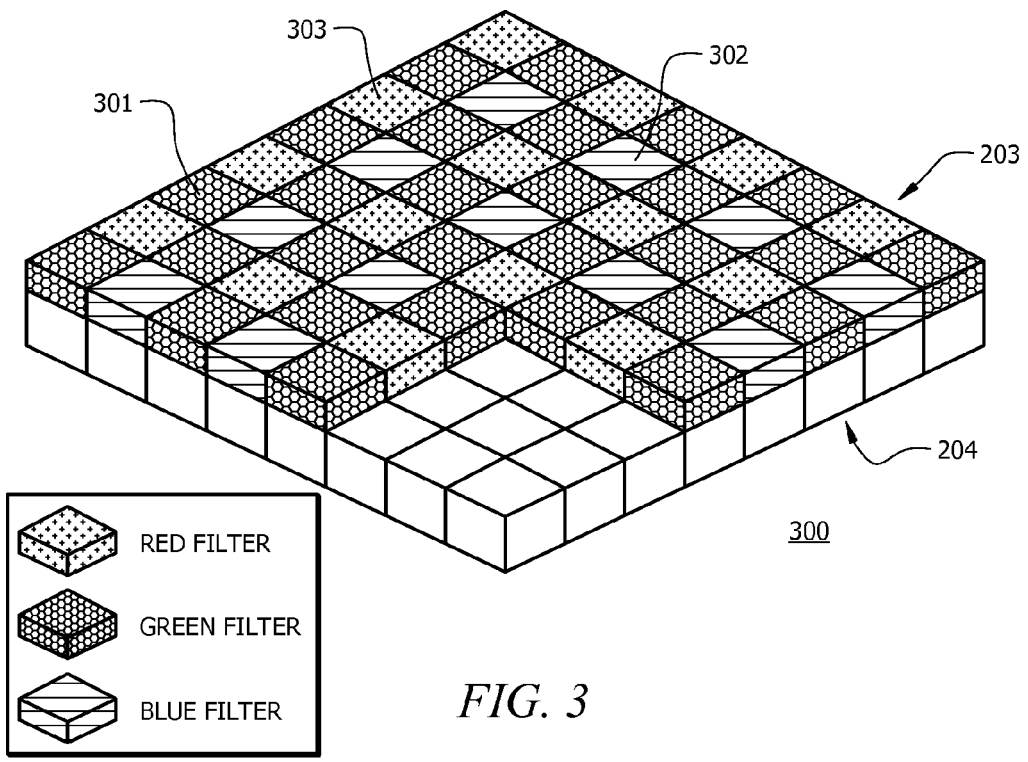
FIG. 3 shows a depiction of a composite sensor array comprising a color filter array secured to a pixel array, according to a disclosed embodiment.

FIG. 3 shows a depiction of a composite sensor array 300 comprising a color filter array 203 secured to (e.g., bonded to) a pixel array 204. Although the number of array elements shown in FIG. 3 and in other FIGs. herein are generally less than 100, as understood by those having ordinary skill in the art, in practical systems the number of array elements will number in the hundreds of thousands or millions of array elements (megapixels). The color filter array 203 can be precisely registered and bonded to the pixel array 204. The filter element "windows" of color filter array 203 are optically aligned and matched (i.e. have about the same size) with respective ones of the plurality photodetector pixels in pixel array 204. The arrangement shown is based on the so-called "Bayer filter" principle, in which the G-sensitive pixels 301 are in a checkerboard pattern and thus occupy half the total area of the composite sensor array 300. The remaining half of the area is shared, shown equally, by the B and R sensitive pixels 302 and 303, respectively. This distribution of sensitivity emulates the sensitivities of the human eye in the respective spectral regions of the primary colors.

To capture an unambiguous polarization signal, the polarization filter elements provide a plurality of different polarization orientations, such as 0, 45, 90 and 135 degrees, or 0, 60 and 120 degrees, which polarizes transmitted near IR light. The polarization filter elements passes or polarizes visible light, while polarizing the near IR, or may polarize visible and near IR light with only the near IR collected signal being processed for the polarimetric response.

Figure 4A:
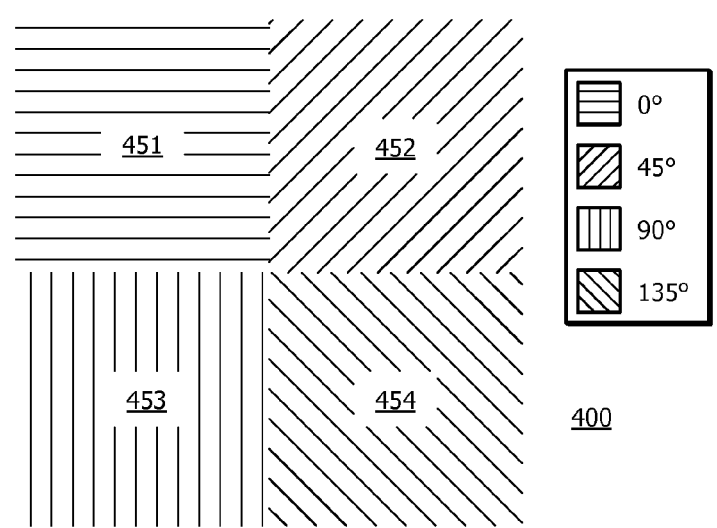
FIG. 4A is a depiction of a linear polarizer array comprising polarization filter elements embodied as a wire grid array having elements oriented at 0, 45, 90, and 135 degrees, respectively, according to a disclosed embodiment.

FIG. 4A shows a depiction of a polarizer array 400. As shown in FIG. 4A, the linear polarizer elements in the polarizer array 400 are wire grid array elements oriented at 0, 45, 90, and 135 degrees, shown as 451, 452, 453, and 454, respectively. The linear polarizer elements 451, 452, 453 and 454 are matched (i.e. have about the same size) with respective ones of the plurality photodetector pixels in pixel array 204 and the RGB filter elements in color filter array 203. As noted above, polarizer array 400 can also be embodied using polarizing thin films, or a frequency selective surface (FSS).

Figure 4B:
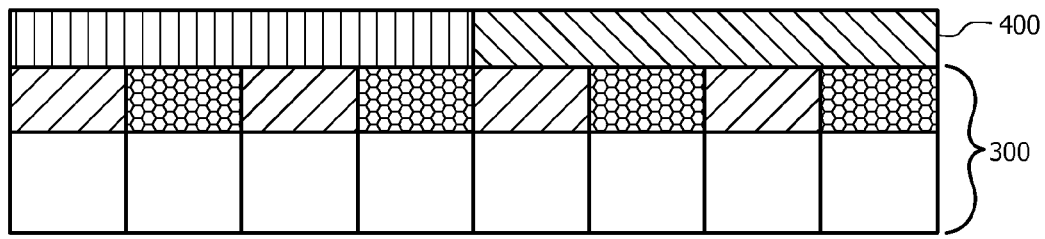
FIG. 4B is a depiction of a polarizer comprising composite sensor array comprising the polarizer array shown in FIG. 4A emplaced over (e.g., bonded to) the composite sensor array shown in FIG. 3, according to a disclosed embodiment.
Figure 4C:
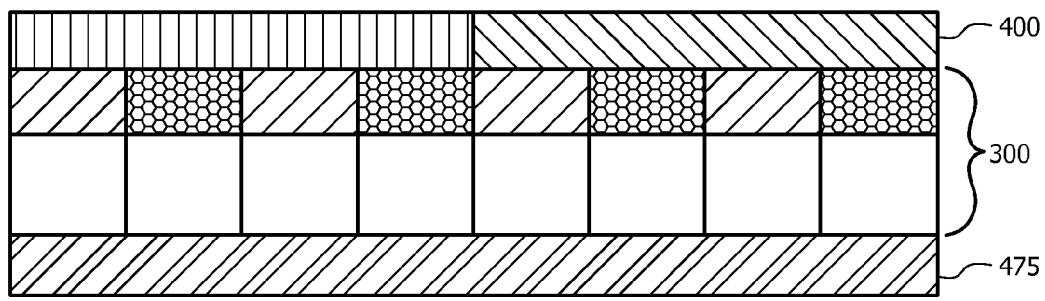
FIG. 4C is a depiction of a chip-based polarizer comprising composite sensor array comprising the polarizer array shown in FIG. 4A emplaced over (e.g., bonded to) the composite sensor array shown in FIG. 3, where the sensor array is formed on a substrate having a semiconductor surface, according to a disclosed embodiment.

FIG. 4B shows a depiction of polarizer comprising composite sensor array 440 that comprises the polarizer array 400 shown in FIG. 4A emplaced over (e.g., bonded to) the composite sensor array 300 shown in FIG. 3. FIG. 4C shows a depiction of an integrated circuit (IC) "chip" based polarizer comprising composite sensor array 470 comprising polarizer array 400 emplaced over (i.e. bonded to) composite sensor array 300, where the sensor array 300 is formed on a substrate 475 having a semiconductor surface (e.g., silicon). In this embodiment, the plurality of photodetector pixels in the pixel array 204 generally comprise CMOS photodetector elements formed using conventional CMOS processing.

Figure 5:
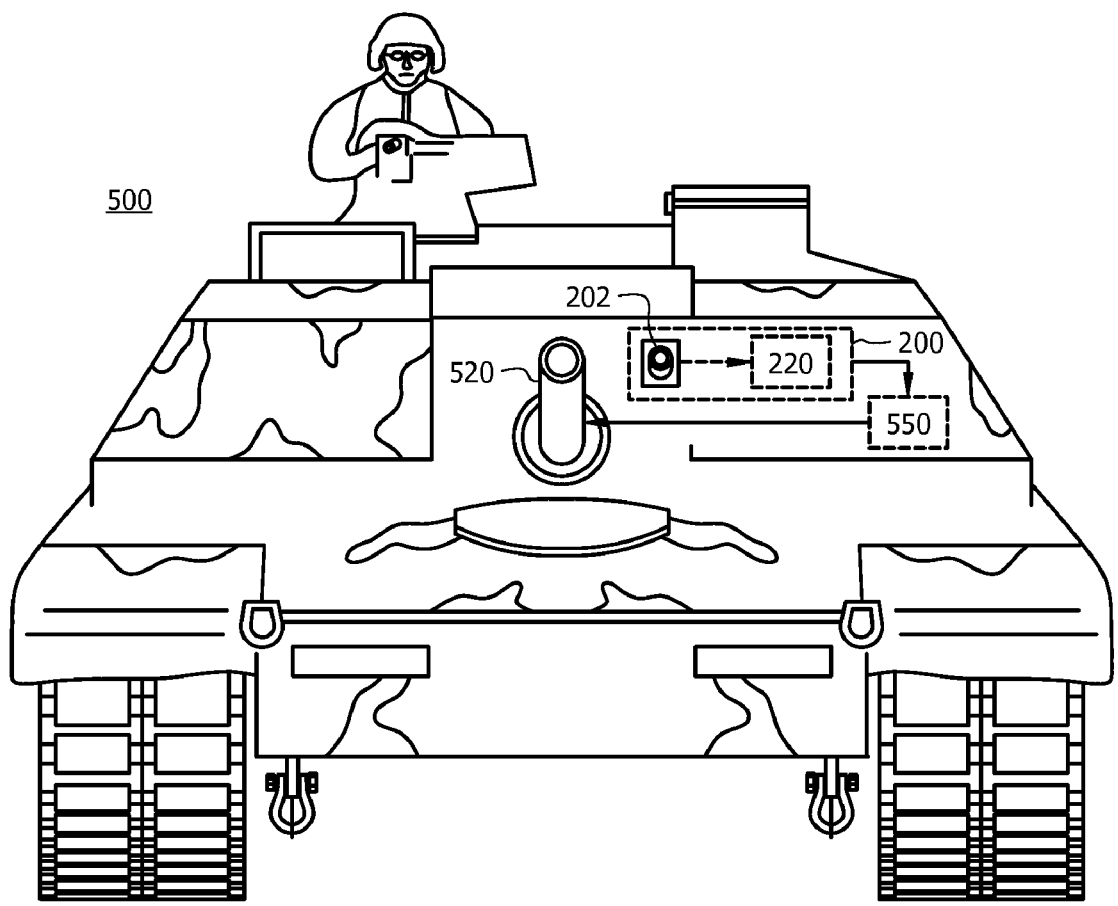
FIG. 5 is a depiction of a vehicle that includes a polarimetric color imaging system, according to a disclosed embodiment.

FIG. 5 is a depiction of a vehicle 500 that includes a polarimetric color imaging system 200, according to a disclosed embodiment. Vehicle 500 is shown as a tank having an outer body 510, but can comprise other land-based vehicles, including defense vehicles such as armored personnel carriers (APCs), aircraft, or watercraft (e.g., ship), or non-defense vehicles. Polarimetric color imaging system 200 is within the vehicle 500 having its aperture/lens 202 shown. Imaging information provided by the polarimetric color imaging system 200 can reveal CC&D/hidden targets which can then be used to aim and then fire armaments, such as a cannon 520 to neutralize the target(s). The processor 220 as described above is operable to compute polarimetric imagery from the near IR band light and color imagery from the color band or color band comprising light, and can identify objects of interest in the polarimetric imagery when present. Vehicle 500 is shown including a controller 550 that is operable to aim the armament 520 based on a signal from the processor 220 from the polarimetric imagery provided. Alternatively, aiming the armament 520 can be manual (e.g., by a soldier), based on polarimetric color images generated (e.g., on a video display).

Embodied as a non-defense vehicle, vehicle 500 can be modified to remove armament 520 and controller 550 and provide an outer body suited for its particular non-defense application. Such a vehicle can utilize polarimetric color imaging system 200 for image acquisition and signal processing to identify hidden or difficult to see objects (e.g. when using color imagery alone).

A method of polarimetric color imaging comprises receiving naturally occurring light emanating from at least one object through a single common aperture, wherein the natural light comprises color band light and near infrared (IR) band light. The color band or color band comprising light and exclusively near IR band light are alternately transmitted by switching between transmitting the color band or color band comprising light and exclusively near IR band light as the transmitted signal. The transmitted signal is array processed comprising processing the color band or color band comprising light during first time intervals (e.g., odd frames) and exclusively near IR band light during second time intervals (e.g., even frames) that do not overlap with the first time intervals.

The array processing of the transmitted signal comprises polarization filtering using a plurality of different polarization filter orientations that are spatially partitioned, color bandpass filtering comprising spatially partitioned R, G, and B filtering, and sensing the transmitted signals using a single common pixel array comprising a plurality of photodetector pixels, following the polarization filtering and color bandpass filtering, to generate a plurality of electrical sensing signals. A polarimetric color image is formed from the plurality of electrical sensing signals, wherein a polarimetric portion of the polarimetric color image is generated exclusively from the near IR band light obtained during the second time intervals (e.g., even frames) and a color portion of the polarimetric color image is generated from the color band or color band comprising light obtained during the first time intervals.

As described above, polarimetric color imaging system described herein which collect all optical information through a common aperture, and use a single common photodetector pixel array for detection of color band comprising light and near IR polarization state information in successive or alternating frames, largely eliminate problems of distortion, alignment, and synchronicity, that have limited conventional polarimetric color imaging systems. The result is a significant enhancement of the capability of discriminating objects and backgrounds.

There is a significant potential for color-polarization imaging, because polarization is a characteristic of light that, until this disclosure, has been largely ignored. A wide variety of industries that use cameras can find benefit in polarimetric color imaging systems described herein. In one example, transportation departments can benefit from ice detection on roads in thick fog conditions. Other exemplary industries that can benefit include tool machining, agriculture, geologic survey, microscopy, medical scanning equipment, semiconductor inspection, gas detection, and security. There are also significant military applications for spectral-polarization imaging related to target acquisition and identification, such as described above relating to FIG. 5.

While various embodiments of the invention have been described above, it should be understood that they have been presented by way of example only, and not as a limitation. Numerous changes to the disclosed embodiments can be made in accordance with the disclosure herein without departing from the spirit or scope of the invention. Thus, the breadth and scope of embodiments of the invention should not be limited by any of the above-described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular, variations on binder oxidizer and surfactant will be apparent to those skilled in the art. While a particular feature of the invention may have been disclosed with respect to only one of several implementations, such a feature may be combined with one or more other features of the other implementations as may be desired and advantageous for any given or particular application.

The terminology used herein is for the purpose of describing particular embodiments only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The invention claimed is:

1. A polarimetric color imaging system, comprising:
    a single common aperture, wherein said system operates exclusively on received light collected through said single common aperture, said received light comprising color band light and near infrared (IR) band light;

a color filter array comprising a plurality of red (R), green (G), and blue (B) filter elements in a path of said received light;

a linear polarizer array comprising a plurality of polarization filter elements that provide a plurality of different polarization orientations optically aligned with respective ones of said R, G and B filter elements;

a single common pixel array comprising a plurality of photodetector pixels for transducing said color band light and said near IR band light after processing by said color filter array and said linear polarizer array into electrical signals, respective ones of said plurality photodetector pixels optically aligned with said plurality of R, G and B filter elements and said plurality of polarization filter elements;

a band select switching device in a path of said received light for switching between transmitting exclusively said near IR band light and said color band or color band comprising light, and a signal processor coupled to receive and process said electrical signals exclusively from said single common pixel array, said signal processor generating color image data from said color band or said color band comprising light during first time intervals and polarimetric image data exclusively from said near IR band light during second time intervals that do not overlap with said first time intervals and color image data from said color band or said color band comprising light.

2. The polarimetric color imaging system of claim 1, wherein said pixel array, said color filter array and said linear polarizer array are in a stacked configuration.

3. The polarimetric color imaging system of claim 2, further comprising a substrate having a semiconductor surface, wherein said pixel array, said color filter array and said linear polarizer array are formed on said semiconductor surface, and said plurality of photodetector pixels comprise Complementary Metal-Oxide Semiconductor (CMOS) photodetector elements.

4. The polarimetric color imaging system of claim 1, wherein said red (R), green (G), and blue (B) filter elements of said color filter array are transmissive band pass filter elements which transmit individual wavebands of red (R), green (G), and blue (B) light, respectively.

5. The polarimetric color imaging system of claim 1, wherein said band select switching device comprises a mechanically rotating filter wheel.

6. The polarimetric color imaging system of claim 1, wherein said near IR band light includes a wavelength range from 750 nm to 1,000 nm.

7. The polarimetric color imaging system of claim 1, wherein said plurality of different polarization orientations comprise 0, 45, 90, and 135 degrees.

8. The polarimetric color imaging system of claim 1, wherein said plurality of different polarization orientations comprise 0, 60, and 120 degrees.

9. The polarimetric color imaging system of claim 1, wherein said signal processor generates fused overlays, said fused overlays combining said polarimetric image data and said color image data.

10. A vehicle having polarimetric color imaging, comprising:
an outer body, and
a polarimetric color imaging system mounted within said vehicle, said polarimetric imaging system comprising:
a single common aperture, wherein said system operates exclusively on received light collected through said single common aperture, said received radiation comprising color band signals and near infrared (IR) band light;

a color filter array comprising a plurality of red (R), green (G), and blue (B) filter elements in a path of said received light;

a linear polarizer array comprising a plurality of polarization filter elements that provide a plurality of different polarization orientations optically aligned with respective ones of said R, G and B filter elements;

a single common pixel array comprising a plurality of photodetector pixels for transducing said color band light and said near IR band light after processing by said color filter array and said linear polarizer array into electrical signals, respective ones of said plurality photodetector pixels optically aligned with said plurality of R, G and B filter elements and said plurality of polarization filter elements;

a band select switching device in a path of said received light for switching between transmitting exclusively said near IR band light and said color band or color band comprising light, and a signal processor coupled to receive and process said electrical signals exclusively from said single common pixel array, said signal processor generating color image data from said color band or said color band comprising light during first time intervals and polarimetric image data exclusively from said near IR band light during second time intervals that do not overlap with said first time intervals and color image data from said color band or said color band comprising light.

11. The vehicle of claim 10, wherein said pixel array, said color filter array and said linear polarizer array are in a stacked configuration and wherein said red (R), green (G), and blue (B) filter elements of said color filter array are transmissive band pass filter elements which transmit individual wavebands of red (R), green (G), and blue (B) light, respectively.

12. The vehicle of claim 10, wherein said vehicle comprises a defense vehicle, further comprising an armament, and wherein said armament is aimed based at least in part on said polarimetric image data.

13. The vehicle of claim 12, further comprising a controller coupled to said signal processor operable to aim said armament based on said polarimetric image data.

14. A method of polarimetric color imaging, comprising:
receiving naturally occurring light emanating from at least one object through a single common aperture, said natural light comprising color band light and near infrared (IR) band light;
switching between exclusively transmitting said near IR band light and said color band light or color band comprising light as a transmitted signal;
array processing said transmitted signal comprising said color band light or said color band comprising light during first time intervals and exclusively said near IR band light during second time intervals that do not overlap with said first time intervals,
wherein said array processing of said transmitted signal comprises:
polarization filtering using a plurality of different polarization filter orientations that are spatially partitioned;
color bandpass filtering comprising spatially partitioned red (R), green (G), and blue (B) filtering, and
sensing said transmitted signal using a single common pixel array comprising a plurality of photodetector pixels following said polarization filtering and said color bandpass filtering to generate a plurality of electrical sensing signals, and forming a polarimetric color image from said plurality of electrical sensing signals, a polarimetric portion of said polarimetric color image generated exclusively from said near IR band light obtained during said second time intervals and a color portion of said polarimetric color image generated from said color band or said color band comprising light obtained during said first time intervals.

15. The method of claim 14, wherein said switching is in a range from 30 to 60 Hz.

16. The method of claim 14, wherein said polarimetric color image comprises a fused overlay, said fused overlay combining polarimetric image data and color image data.

17. The method of claim 14, wherein said color band comprising light comprises said color band light and said near infrared IR band light.

18. The method of claim 17, wherein said forming said polarimetric color image further comprises subtraction of an intensity of said near IR band light obtained during said second time intervals to obtain said color portion of said of said polarimetric color image.

19. The method of claim 14, wherein said near IR band light includes a wavelength range from 750 nm to 1,000 nm.

20. The method of claim 14, wherein said red (R), green (G), and blue (B) filter elements of said color filter array are transmissive band pass filter elements which transmit individual wavebands of red (R), green (G), and blue (B) light, respectively.

* * * * *